United States Patent [19]

Marsee

[11] 3,971,352
[45] July 27, 1976

[54] FUEL INDUCTION SYSTEM
[75] Inventor: Frederick J. Marsee, Clawson, Mich.
[73] Assignee: Ethyl Corporation, Richmond, Va.
[22] Filed: Aug. 20, 1974
[21] Appl. No.: 498,960

Related U.S. Application Data
[63] Continuation-in-part of Ser. No. 439,912, Feb. 6, 1974, abandoned.

[52] U.S. Cl. .................. 123/122 AC; 123/122 AB; 123/127; 165/52
[51] Int. Cl.² ........................................ F02M 31/00
[58] Field of Search... 123/122 A, 122 AB, 122 AC, 123/122 E, 127, 52 MV, 325 T, 325 D, 75 B; 165/52; 261/145

[56] References Cited
UNITED STATES PATENTS

| | | | |
|---|---|---|---|
| 890,970 | 6/1908 | Durr | 123/122 AB |
| 1,458,481 | 6/1923 | Good | 123/122 AC |
| 1,479,381 | 1/1924 | Good | 123/122 AC |
| 1,492,921 | 4/1924 | Godward | 123/122 AC |
| 1,663,634 | 3/1928 | Kemp | 123/122 AC |
| 1,777,472 | 10/1930 | Mock | 123/122 AB |
| 1,854,298 | 4/1932 | Godward | 123/122 AC |
| 2,245,394 | 5/1956 | Holley | 123/122 AC |
| 3,016,051 | 1/1961 | Summer | 123/122 AC |
| 3,037,493 | 6/1962 | Burch | 123/52 MV |
| 3,310,045 | 3/1967 | Bartholemew | 123/127 |
| 3,809,032 | 5/1974 | Norris | 123/127 |
| 3,814,071 | 6/1974 | Buchwald | 123/122 AB |
| 3,827,416 | 8/1974 | Ader | 123/122 AC |
| 3,850,153 | 11/1974 | Sigwald | 123/122 AB |

Primary Examiner—Charles J. Myhre
Assistant Examiner—R. H. Lazarus
Attorney, Agent, or Firm—Donald L. Johnson; Robert A. Linn; Joseph D. Odenweller

[57] ABSTRACT

An induction system for a gasoline-fueled four-cycle engine having a carburetor which delivers an air/fuel mixture through a primary venturi to a "hot box" evaporation container located in the engine exhaust stream causing any liquid gasoline to be vaporized. The vaporized air/fuel mixture is then conducted to the intake manifold. In V-type engines the "hot box" is located in the exhaust cross-over. At high load a secondary venturi delivers air/fuel mixture directly to the intake manifold. Fuel distribution in multicylinder engines is thereby improved permitting leaner operation without misfire, resulting in decreased hydrocarbon and carbon monoxide emission.

13 Claims, 8 Drawing Figures

FUEL INDUCTION SYSTEM

BACKGROUND

Of recent years there has been a trend toward operating spark-ignited internal combustion engines at leaner air/fuel ratios in order to decrease the amount of hydrocarbon and carbon monoxide in the exhaust. One limiting factor in going towards leaner operation is gasoline maldistribution from cylinder to cylinder. The inducted air/fuel ratio must be kept lean enough such that the cylinder supplied with the leanest mixture will still fire, otherwise exhaust hydrocarbon and carbon monoxide emission will increase rather than decrease. The problem is most acute when the choke is first moved to the open or off position because, at that time, the carburetor and associated hardware are not up to operating temperature and much of the inducted gasoline remains in liquid form causing excessive maldistribution.

Several methods have been proposed to minimize the problem. According to one method the entire intake manifold on which is mounted the primary venturi carburetor is heated by providing an exhaust gas jacket around the intake manifold (Bartholomew, "Potentialities of Emission Reduction by Design of Induction Systems," S.A.E. Meeting January 1966, Detroit, Mich). According to another method a "hot spot" is provided in the intake manifold directly below the primary venturi. This is accomplished by having a thin sheet metal plate separate the exhaust cross-over from the intake manifold at this location (W. D. Bond, "Quick-Heat Intake Manifolds for Reducing Cold Engine Emissions," S.A.E. Meeting October 1972, Tulsa, Oklahoma). Both of these methods are effective but do not eliminate the problem.

Other related induction systems resulting from a prior art search are listed in chronological order are:

Kambak, U.S. Pat. No. 1,479,547 (1924) which discloses an induction system in which liquid fuel is delivered into a bulbous chamber located in the exhaust manifold. The liquid fuel is vaporized and then mixed with air which is inducted through separate means.

Maroger, Fr. U.S. Pat. No. 629,582 (1926) which discloses an exhaust-jacketed heat exchanger placed between the carburetor and the engine intake.

Mock, U.S. Pat. No. 1,777,472 (1930) which employs a thin wall "hot spot" in the carburetor adjacent to the power jet to assist in vaporization of excess gasoline inducted during acceleration.

Duthoit, U.S. Pat. No. 2,066,720 (1937) which discloses an updraft carburetor in which the air/fuel mixture is conducted through a bulbous conduit which extends transversely through the exhaust manifold.

Titus, U.S. Pat. No. 2,720,197 (1955) which discloses a liquid-heated heat exchanger installed between the carburetor and the intake manifold.

Summers, U.S. Pat. No. 3,016,051 (1962) disclosing a two-barrel induction system for a V-type engine which includes a U-tube which connects the two separate branches of the intake manifold. The U-tube extends into the exhaust cross-over.

SUMMARY OF THE INVENTION

According to the present invention fuel maldistribution in a multicylinder engine can be practically eliminated by providing an evaporation container or "hot box" placed directly in and surrounded by the exhaust gas flow path. The primary carburetor barrel or venturi (which designations are used interchangeably) delivers an air/fuel mixture directly to the "hot box" wherein it is rapidly heated, causing any liquid gasoline to vaporize and form a homogenous mixture. The vaporized air/fuel mixture is then conducted into the intake manifold. At high load the secondary venturi opens and delivers a secondary air/fuel mixture directly to the intake manifold. In a V-type engine installation the "hot box" is placed inside the exhaust gas cross-over at a location underneath the carburetor. The primary barrels are fitted with a conduit which delivers the primary air/fuel mixture directly to the "hot box". It is then conducted to each of the separate branches of a conventional intake manifold, thus insuring that all cylinders receive the same air/fuel mixture even when the two primary barrels are out of adjustment.

DESCRIPTION OF THE PREFERRED EMBODIMENTS

A preferred embodiment of this invention is a fuel induction system for a gasoline-fueled multicylinder spark-ignited internal combustion engine resulting in improved cylinder-to-cylinder fuel distribution enabling operation of said engine at lean air/fuel ratios with resultant decreased emission of hydrocarbons and carbon monoxide in the exhaust gas of said engine, said system comprising in combination an intake manifold for delivering air/fuel mixture to each of said multicylinders, a carburetor having means for atomizing gasoline into a carburetor barrel to form said air/fuel mixture, an exhaust gas passage through which hot exhaust gas flows, an enclosed evaporation container having an inlet and an outlet, said evaporation container being separate from said intake manifold, said evaporation container being located in said exhaust gas passage, first passage means connecting said carburetor barrel to said inlet adapted to conduct said air/fuel mixture into said evaporation container, and second passage means connecting said outlet to said intake manifold adapted to deliver air/fuel mixture from said evaporation container into said intake manifold.

Figure 1:
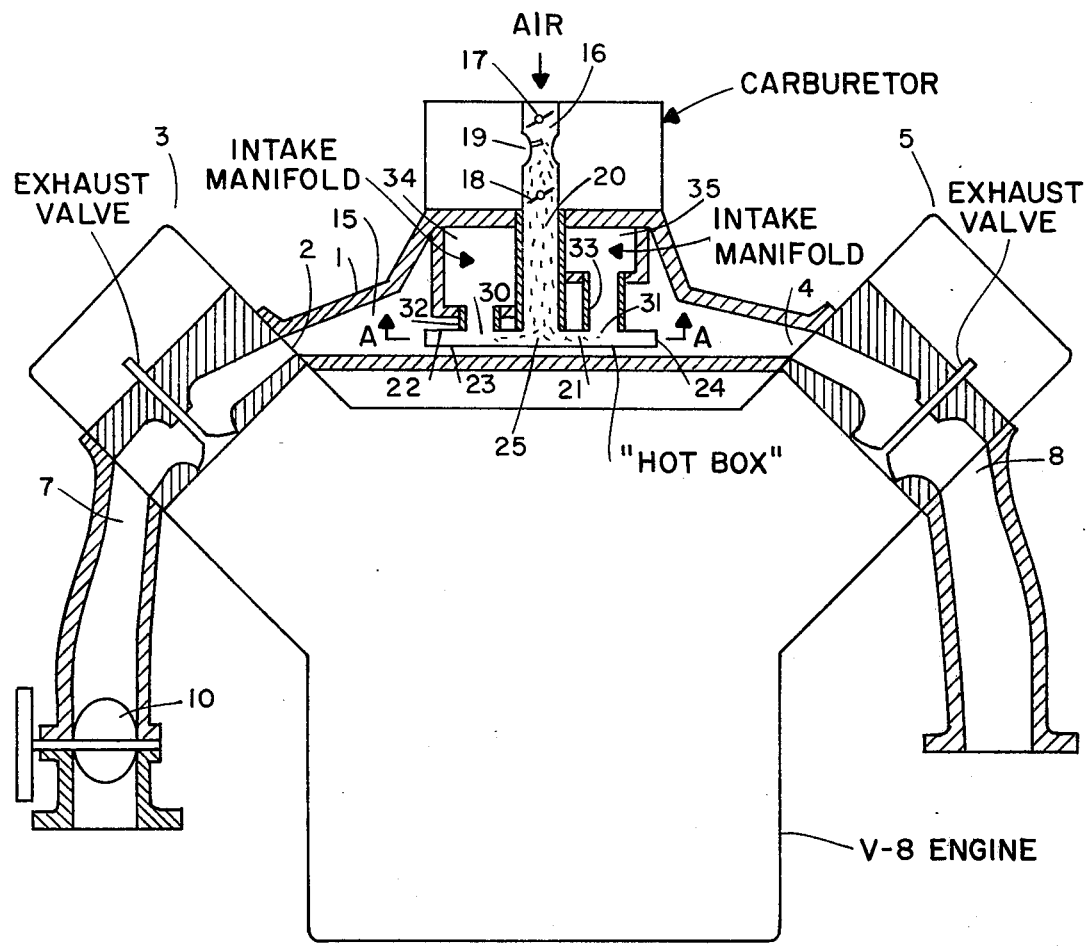
FIG. 1 is a schematic cross-section of a V-type multicylinder spark-ignited internal combustion engine showing the "hot box" evaporation container located in the exhaust gas cross-over.

Such an embodiment is shown in FIG. 1 which depicts a V-type engine fitted with an exhaust gas cross-over 1 connecting the exhaust outlets 2 of the left cylinder bank 3 to the exhaust port 4 of right cylinder bank 5. Exhaust ports 7 and 8 normally conduct exhaust gas to the atmosphere. When the engine is cold, valve 10 is closed, causing the exhaust gas which normally exits through port 7 to exit through outlet 2 and pass through passage 15 of exhaust cross-over 1 and exit through exhaust port 8.

Mounted on cross-over 1 is a carburetor. Only the primary barrel of the carburetor is shown. Choke valve 17 and throttle valve 18 are located in barrel 16. Fuel nozzle 19 extends into the venturi section.

Figure 2:
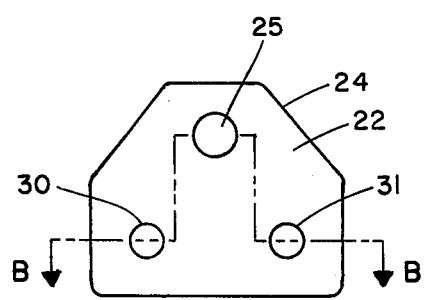
FIG. 2 is a cross-sectional view of the "hot box" taken at AA of FIG. 1.

Barrel 16 is in fluid communication by primary air/fuel conduit 20 with evaporation container 21, which is referred to as a "hot box" because of its location surrounded by the hot exhaust stream. Container 21 is enclosed by upper wall 22, lower wall 23 and peripheral closure 24. FIG. 2 is a cross-section of evaporation container 21 looking upward showing upper wall 22. The exhaust cross-over and carburetor portion of FIG. 1 is a cross-section indicated by BB in FIG. 2. Container 21 is of sheet metal construction to insure good heat transfer properties and is constructed in a wide flat configuration to give optimum heat transfer to air/fuel mixture passing through it. In a typical installation in a 360 CID V-8 automotive engine container 21 is about 1.1 inches deep and approximately 5.06 × 4.9 inches. Its volume is about 27.03 cubic inches. Primary conduit 20 enters container 21 through inlet 25. Outlets 30 and 31 are provided in container 21 which communicate through conduits 32 and 33 to intake manifolds 34 and 35, each of which is connected to a different one-half of the cylinders of the engine.

In operation, the engine is started cold and an air/fuel mixture is inducted through primary barrel 16, passing through primary conduit 20 and entering evaporation container 21 at inlet 25. Since the engine is cold, valve 10 is closed and the exhaust gas from the left cylinder bank exits through outlet 2 and passes through passage 15 of cross-over 1 and is exhausted through ports 4 and 8. Evaporation container 21 becomes immediately surrounded by hot exhaust gas rapidly heating the sheet metal walls defining the container. It functions as an oven or "hot box" and, due to its location at the lowest point in the path of the air/fuel mixture, also functions as a sink, minimizing escape of liquid gasoline. Also, its wide flat construction causes effective radiation of heat from all wall sections and promotes actual contact of the air/fuel mixture with a hot wall section.

Liquid droplets entering evaporation container 21 are rapidly vaporized and the evaporated air/fuel mixture passes through outlets 30 and 31 and conduits 32 and 33 into intake manifolds 34 and 35. Each of intake manifolds 34 and 35 delivers the homogenous air/fuel mixture to a different one-half of the cylinders of the multicylinder engine. After the engine becomes hot, valve 10 opens and exhaust gas flow in cross-over 1 is reduced, but by then the entire intake system is hot and air/fuel maldistribution is no longer as severe. However, even under these conditions, the "hot box" provides better air/fuel distribution than is attainable by use of standard induction systems.

Figure 3:
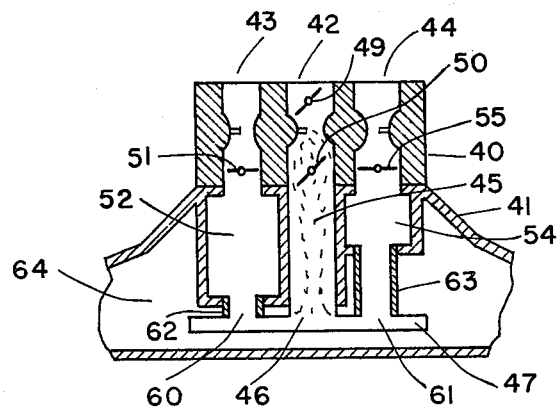
FIG. 3 is a cross-section of a carburetor mounted on the exhaust gas cross-over of a V-type engine including both primary and secondary venturi.

FIG. 3 shows an embodiment of the invention including a carburetor having both primary and secondary barrels. In it, carburetor 40 is mounted on exhaust cross-over 41. Carburetor 40 contains both a primary barrel 42 and secondary barrels 43 and 44. Primary barrel 42 connects through primary air/fuel conduit 45 to inlet 46 of evaporation container 47. Located in primary barrel is choke valve 49 and throttle valve 50. Secondary barrel 43 contains throttle 51 and communicates directly with intake manifold 52. Intake manifold 52 supplies air/fuel mixture to one-half of the cylinders. Likewise, secondary barrel 44 communicates directly with intake manifold 54 through throttle valve 55 and supplies air/fuel mixture to the remaining one-half of the cylinders.

Evaporation container 47 communicates through outlets 60 and 61 and conduits 62 and 63 with intake manifolds 52 and 54. Container 47 is located in and completely surrounded by hot exhaust flow path 64 within exhaust cross-over 41.

In operation starting with a cold engine, throttle valve 50 opens in response to accelerator depression. Choke 49 is partially closed. Air/fuel mixture containing liquid droplets passes down primary air/fuel conduit 45 into evaporation container 47. Container 47 is rapidly heated by hot exhaust gas passing through cross-over 41 because it is almost entirely surrounded by the hot exhaust. This causes liquid gasoline in the air/fuel mixture to vaporize. The evaporated air/fuel mixture passes upwardly through outlets 60 and 61 and through conduits 62 and 63 into intake manifolds 52 and 54.

If volumetric air/fuel demand is more than can be efficiently supplied by primary barrel 42, then throttle valves 51 and 55 in secondary barrels 42 and 43 will open in response to increased demand to supply additional air/fuel mixture directly to intake manifolds 52 and 54. This will not normally occur until the engine is hot since the engine is not normally placed under high load while cold.

Figure 4:
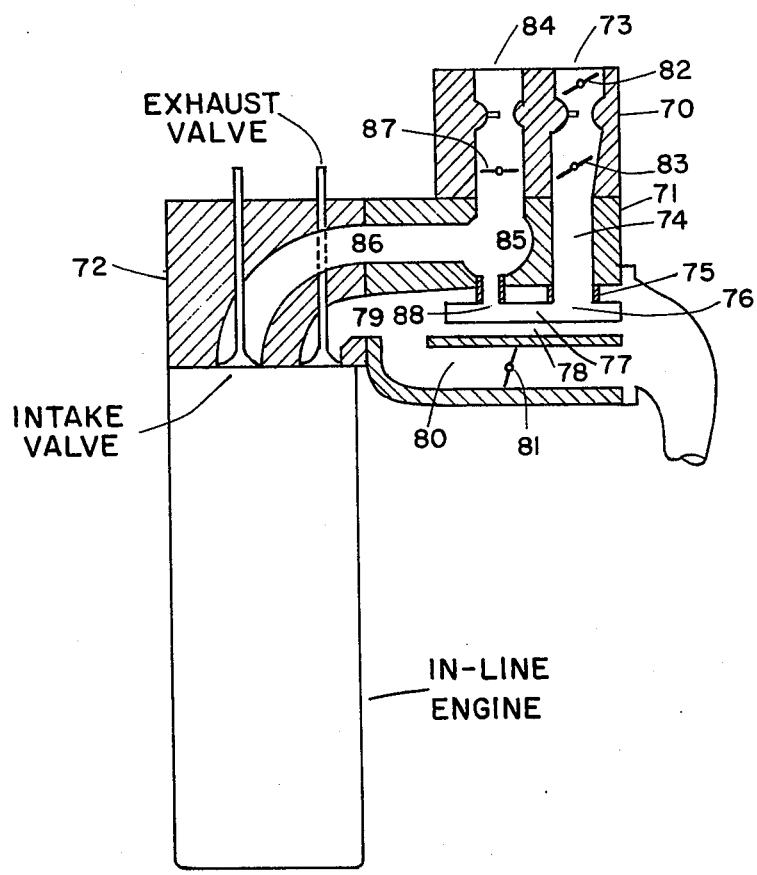
FIG. 4 is a schematic cross-section of an in-line spark-ignited internal combustion engine showing the "hot box" located beneath the intake manifold in an exhaust gas passage.
Figure 5:
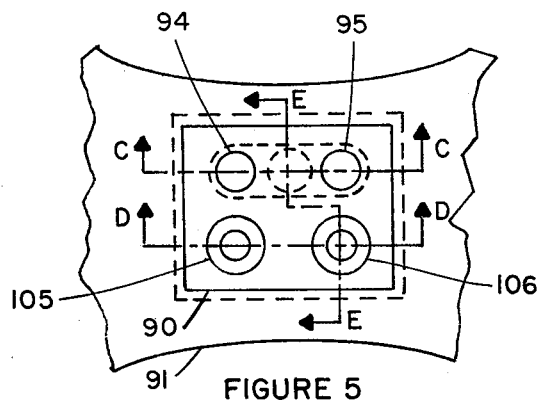
FIG. 5 is a top view of a four-barrel carburetor mounted on an intake manifold as used in a V-type engine.
Figure 6:
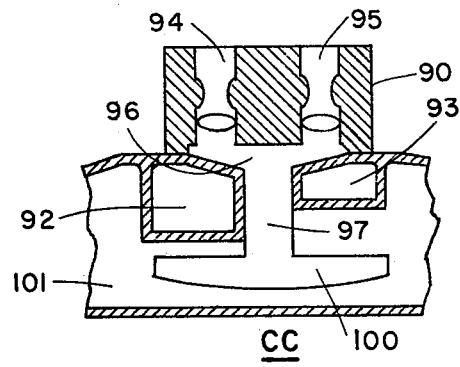
FIG. 6 is a cross-section of the four-barrel carburetor taken at CC through the two primary barrels showing both branches of the intake manifold and the exhaust cross-over.
Figure 7:
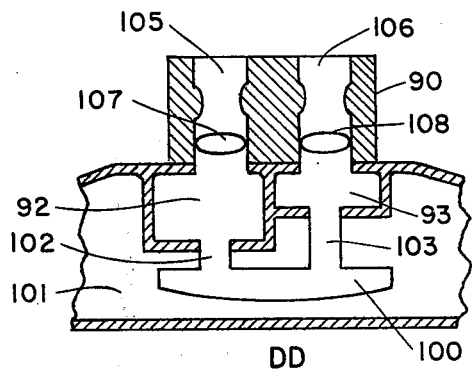
FIG. 7 is a cross-section of the four-barrel carburetor taken at DD through the two secondary barrels.
Figure 8:
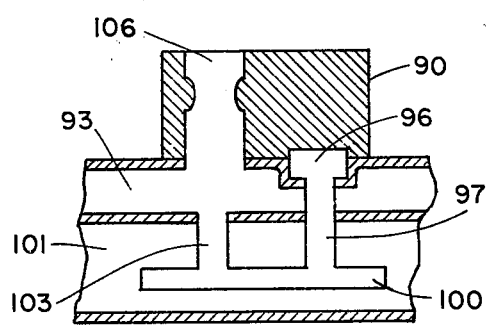
FIG. 8 is a cross-section of the four-barrel carburetor taken at EE.

The improved fuel induction system is adaptable for use with in-line engines. This embodiment is shown in FIG. 4. Carburetor 70 is mounted on manifold 71 which is connected to cylinder head 72. Primary barrel 73 communicates through primary air/fuel passage 74 and conduit 75 with inlet 76 of evaporation container 77 located in exhaust passage 78. Passage 78 connects with engine exhaust port 79. Evaporation container 77 connects through outlet 88 with intake manifold 85. Located in primary barrel 73 is choke 82 and throttle 83. Exhaust passage 80 forms a by-pass when heat valve 81 is open.

Secondary barrel 84 connects directly with intake manifold 85 which is connected to the engine intake ports 86. Throttle valve 87 controls air/fuel delivery through the secondary barrel.

In operation starting with a cold engine, heat valve 81 and choke 82 are closed. Air/fuel mixture is inducted through primary barrel 73 and conduit 74 into evaporation container 77. Hot exhaust gas leaving exhaust port 79 is diverted through exhaust passage 78 wherein it surrounds and rapidly heats container 77, causing unvaporized gasoline to vaporize. Evaporated air/fuel mixture is conducted through outlet 88 upwardly to intake manifold 85 from where it is inducted into the engine through intake ports 86. After the engine is hot, valve 81 opens reducing the heat supplied to container 77. Under high load, secondary throttle valve 87 opens to supply additional air/fuel mixture through secondary barrel 84 directly to intake manifold 85.

As stated previously, the present induction system greatly reduces fuel maldistribution problems encountered with multicylinder engines and allows use of leaner air/fuel ratios without engine misfire. Tests were carried out using a modern 360 CID V-8 automotive engine fitted with a "hot box" in the exhaust cross-over connected to the two primary barrels of a four-barrel carburetor. The following table shows the average air/fuel ratios at various speeds and the deviation in air/fuel ratios from leanest to richest cylinder.

| Speed | Avg. A/F ratio | Spread from richest to leanest cylinder |
|---|---|---|
| Idle | 16.3 | 0.50 |
| 15 | 17.5 | 0.49 |
| 30 | 17.3 | 0.28 |
| 50 | 16.6 | 0.47 |

As the above results show, the air/fuel ratio from the richest cylinder to the leanest cylinder did not exceed 0.5 at any time.

Another significant improvement resulting from use of the present induction system is that it can eliminate deviation due to use of separate intake manifolds to supply different cylinders. In V-type engines it is conventional to use two separate intake manifolds, each supplying air/fuel mixture to one-half of the cylinders. Each manifold has its own primary barrel. Any maladjustment of the idle setting or deviation in the fuel jet size between these two primary barrels makes one set of cylinders operate at a significantly different air/fuel ratio from the other set. According to the present invention, as shown in FIGS. 1 and 3, a single primary barrel supplies air/fuel mixture to both intake manifolds through the "hot box" thus insuring equal average air/fuel ratios to both sets of cylinders. Alternatively, two or more primary barrels may be used in place of the single primary barrel shown in FIGS. 1 and 3. In this embodiment, all the primary barrels supply air/fuel mixture to a common "hot box" which forms a homogenous evaporated air/fuel mixture which is supplied to the separate intake manifolds, thus assuring the same air/fuel mixture is supplied to all cylinders.

In an alternate arrangement the two primary barrels of a four-barrel carburetor connect to a common conduit forming a Y-connection and the common conduit connects and delivers the primary air/fuel mixture to the "hot box".

A test was conducted which demonstrated the above mixing and equalizing effect. A 360 CID V-8 engine fitted with a conventional 4-barrel fuel induction system was used. The idle mixture screws in each primary barrel were purposely maladjusted in opposite directions -- one lean and one rich. The air/fuel ratio delivered to each cylinder was then measured. Following this, the "hot box" system was installed in the exhaust cross-over. Both primary barrels were connected to the "hot box" which in turn was connected to each set of intake passages. As before, the idle screws were purposely maladjusted and the air/fuel ratio delivered to each cylinder was measured. The results obtained with and without the "hot box" system were as follows.

| Cylinder No. | Air/Fuel Ratio | |
|---|---|---|
| | Std. System | "Hot Box" System |
| 1 | 17.0 | 13.55 |
| 4 | 15.55 | 13.6 |
| 6 | 15.55 | 13.0 |
| 7 | 16.35 | 13.65 |
| 2 | 14.05 | 13.85 |
| 3 | 14.0 | 13.7 |
| 5 | 15.0 | 13.85 |

-continued

| Cylinder No. | Air/Fuel Ratio | |
|---|---|---|
| | Std. System | "Hot Box" System |
| 8 | 13.7 | 13.9 |

As the above results show, the maximum spread from richest to leanest cylinder in terms of air/fuel ratio was reduced from 3.3 without the "hot box" to only 0.9 with the "hot box".

Another beneficial feature of the induction system when used with a multi-barrel carburetor having at least one primary barrel and one secondary barrel is that the updraft of evaporated primary air/fuel mixture from the "hot box" impinges the down-flowing secondary air/fuel mixture from the secondary barrel. This feature comes into play at high load when the secondary barrel functions. This is shown in FIG. 3. Primary air/fuel mixture flows down conduit 45 into evaporation container 47 and up through outlets 60 and 61 and conduits 62 and 63 into intake manifolds 52 and 54. At high load, secondary throttle valves 51 and 55 open causing a secondary air/fuel mixture to be delivered down through secondary barrels 43 and 44 into intake manifolds 52 and 54 where it impinges the upward-flowing primary air/fuel mixture. The resulting turbulence gives a homogenous air/fuel mixture having excellent combustion properties. Thus, the induction system is beneficial not only during cold start operation but also during operation under heavy load.

Installation of the "hot box" in a V-type engine fitted with a four-barrel carburetor is shown in FIGS. 5, 6, 7 and 8. Four-barrel carburetor 90 is mounted on intake manifold 91 which has two sets of intake passages 92 and 93, each connected and adapted to deliver an air/fuel mixture to four of the eight cylinders of the V-type engine. Carburetor 90 has two primary barrels 94 and 95 which connect by Y-passage 96 through a common conduit 97 to container 100 which is located in exhaust cross-over passage 101.

Container 100 connects upwardly through second passages 102 and 103 to intake passages 92 and 93. Secondary barrels 105 and 106 connect directly to intake passages 92 and 93 at a location opposite that where second passages 102 and 103 connect. As constructed, secondary barrel 105 is on the same axis as second passage 102 and secondary barrel 106 is on the same axis as second passage 103. Secondary throttle valves 107 and 108 control fluid flow through barrels 105 and 106.

In operation, when the engine is started gasoline is atomized in the venturi section of primary barrels 94 and 95 and the resultant air/fuel mixture is drawn down through Y-passage 96 and conduit 97 into container 100. Hot exhaust gas flowing through exhaust cross-over 101 immediately heats container 100 which, together with the turbulence in container 100, results in a uniform air/fuel mixture. This mixture is drawn upwardly through second passages 102 and 103 into intake passages 92 and 93, respectively. This results in an identical air/fuel ratio being delivered to both sets of intake passages, even when the two primary barrels 94 and 95 are inducting a different air/fuel ratio.

In practice, it has been found that a small amount of air leaks past secondary throttle valves 107 and 108. Because of the location of secondary barrels 105 and 106 directly opposite second passages 102 and 103, any air leaking past valves 107 and 108 is distributed equally in both directions in intake passages 92 and 93, which further improves the uniformity of the air/fuel mixture delivered to the individual cylinders.

At high engine load, such as occurs during rapid acceleration or high vehicle speed, secondary throttle valves 107 and 108 open to deliver additional air/fuel mixture. Because of the location of secondary barrels 105 and 106 directly opposite second passages 102 and 103, the downflow of secondary air/fuel mixture impinges the upflow of primary air/fuel mixture forming a uniform mixture and further assists in delivering a uniform air/fuel mixture to the engine cylinders.

Tests have been carried out that demonstrate that the uniform air/fuel mixture and resultant reduction in cylinder-to-cylinder maldistribution enables an engine to operate to give reduced amounts of hydrocarbon and carbon monoxide in the exhaust gas and at the same time retain good driveability. The test was conducted with a 1974 vehicle having a 360 CID V-8 engine. The exhaust hydrocarbon and carbon monoxide were measured both with and without the "hot box" in the induction system at various engine speeds. The results were as follows:

| Engine speed equivalent to | Hydrocarbon (ppm) | | CO (%) | |
|---|---|---|---|---|
| | Without hot box | With hot box | Without hot box | With hot box |
| idle | 62 | 36 | .16 | .15 |
| 15 | 31 | 19 | .21 | .15 |
| 20 | 41 | 20 | .21 | .15 |
| 25 | 72 | 23 | .24 | .15 |
| 30 | 100 | 39 | .18 | .18 |
| 40 | 82 | 67 | .18 | .18 |
| 50 | 67 | 43 | .18 | .20 |

These test results show that the "hot box" induction system gave substantially lower hydrocarbon emissions at all engine speeds and lower carbon monoxide emissions under most operating conditions.

The same 1974 vehicle was then subjected to the Federal CVS emission test following the 1975 HEW schedule. The results of this standard emission test with and without the "hot box" were as follows:

| | Hydrocarbon | CO | $NO_x$ |
|---|---|---|---|
| Without hot box | 2.04 g/mi | 17.5 g/mi | 2.62 g/mi |
| With hot box | 1.37 g/mi | 7.74 g/mi | 2.48 g/mi |
| % reduction | 32.9% | 55.8% | |

These results show that the "hot box" induction system enables the vehicle to be operated at much lower hydrocarbon and carbon monoxide emission levels and at the same time retain excellent driveability.

I claim:

1. An internal combustion engine having improved cylinder-to-cylinder fuel distribution enabling operation of said engine at lean air/fuel ratios with resultant decreased emission of hydrocarbon and carbon monoxide in the exhaust gas, said engine comprising the combination of a multicylinder spark-ignited internal combustion engine, intake manifold means for delivering air/fuel mixture to each of said multicylinders, carburetor means having means for atomizing gasoline into a carburetor barrel, an exhaust gas passage through which hot exhaust gas flows, an enclosed container defined by a bottom wall, side wall, and top wall having an inlet in said top wall and an outlet, said container being separate from said intake manifold, said container being located within said exhaust gas passage, first passage means connecting said carburetor barrel directly to said inlet to conduct all of said air/fuel mixture into said container, second passage means connecting said outlet to said intake manifold means to deliver said air/fuel mixture from said container into said intake manifold means; said first passage means, said container and said second passage means forming the only flow path for substantially all of said air/fuel mixture from said carburetor barrel into said intake manifold means.

2. An engine of claim 1 wherein said first passage means connects said carburetor barrel downwardly to said inlet and said second passage means connects said outlet upwardly to said intake manifold whereby said container forms a sink for unvaporized gasoline.

3. An engine of claim 2 wherein said container is positioned in said exhaust passage such that it is substantially completely surrounded by said hot exhaust gas.

4. An engine of claim 2 wherein said multicylinder engine is a multicylinder V-type engine having a carburetor, an exhaust gas cross-over passage, an enclosed container located inside said exhaust gas cross-over passage adapted to be in heat exchange relationship with hot exhaust gas flowing through said cross-over passage, said container having an inlet and an outlet, a barrel in said carburetor connected through first passage means downwardly to said inlet, said outlet being connected through second passage means upwardly to said intake manifold means; said first passage means, said container and said second passage means forming the only flow path for substantially all of said air/fuel mixture from said barrel into said intake manifold means.

5. An engine of claim 4 having two separate sets of passages in said intake manifold, each set being connected to deliver an air/fuel mixture to one-half of said multicylinders, said container having two of said outlets, each of said outlets being connected through second passage means upwardly to a different one of said sets of passages in said intake manifold whereby the air/fuel mixture delivered to each of said sets of passages from said container has the same air/fuel ratio.

6. An engine of claim 4 further characterized by having at least one primary barrel having means for forming a primary air/fuel mixture and at least one secondary barrel having means for forming a secondary air/fuel mixture in said carburetor, said primary barrel being connected through said first passage means downwardly to said inlet of said container and said secondary barrel being connected and adapted to deliver said secondary air/fuel mixture directly to said intake manifold during periods of high engine load, said outlet of said container being connected through second passage means upwardly to said intake manifold; said first passage means, said container and said second passage means forming the only flow path for substantially all of said primary air/fuel mixture from said primary barrel into said intake manifold.

7. An engine of claim 6 further characterized by having two separate sets of passages in said intake manifold, each set being adapted to deliver an air/fuel mixture to one-half of said multicylinders, said container having two of said outlets, each of said outlets being connected through said second passage means upwardly to a different one of said sets of passages in said intake manifold whereby the air/fuel mixture delivered to each of said sets of passages from said container has the same air/fuel ratio.

8. An engine of claim 2 wherein said multicylinder engine is a multicylinder in-line engine having an exhaust gas passage proximate to said intake manifold and including an enclosed container separate from said intake manifold located inside said exhaust gas passage adapted to be in heat exchange relationship with hot exhaust gas flowing through said exhaust gas passage, said container having an inlet and an outlet, a barrel in said carburetor means connected directly through first passage means downwardly to said inlet, said outlet being connected through second passage means upwardly to said intake manifold; said first passage means, said container and said second passage means forming the only flow path for substantially all of said air/fuel mixture from said barrel into said intake manifold.

9. An engine of claim 8 further characterized by having at least one primary barrel having means for forming a primary air/fuel mixture and one secondary barrel having means for forming a secondary air/fuel mixture, said primary barrel being connected through said first passage means downwardly to said inlet in said container and said secondary barrel being connected and adapted to deliver said secondary air/fuel mixture directly to said intake manifold during periods of high engine load, said outlet of said container being connected through second passage means upwardly to said intake manifold; said first passage means, said container and said second passage means forming the only flow path for substantially all of said primary air/fuel mixture from said primary barrel into said intake manifold.

10. An engine of claim 2 wherein said carburetor includes at least one primary barrel and one secondary barrel, said primary barrel being connected through said first passage means downwardly to said inlet in said container, said secondary barrel being connected and adapted to deliver supplemental air/fuel mixture directly to said intake manifold during periods of high engine load, said outlet of said container being connected through said second passage means upwardly to said intake manifold, the location at which said second passage means and said secondary barrel connect to said intake manifold being longitudinally substantially the same whereby fluid entering said intake manifold through said secondary barrel impinges with air/fuel mixture entering through said second passage means forming a uniform air/fuel mixture.

11. An engine of claim 10. wherein said multicylinder engine is a multicylinder V-type engine having an exhaust gas cross-over passage and including an enclosed container located inside said cross-over passage adapted to be in heat exchange relationship with hot exhaust gas flowing through said cross-over passage, said container having at least one inlet and having two outlets, said carburetor having at least one primary barrel and having two secondary barrels, said intake manifold having two sets of passages, each set being connected to deliver an air/fuel mixture to one-half of said multicylinders, said primary barrel being directly connected through said first passage means downwardly to said inlet, each of said outlets being connected through said second passage means upwardly to a different one of said two sets of passages in said intake manifold, each of said two secondary barrels being connected and adapted to deliver a supplemental air/fuel mixture directly to a different one of said two sets of passages in said intake manifold during periods of high engine load, the location in each of said sets of passages at which each of said second passage means and said secondary barrels connects being longitudinally substantially the same whereby fluid entering each of said sets of passages through said secondary barrels impinges with air/fuel mixture entering said sets of passages through said second passage means forming a uniform air/fuel mixture in each of said sets of passages in said intake manifold.

12. An engine of claim 11 further characterized by having two primary barrels, each being connected by first passage means downwardly to said container.

13. A fuel induction system of claim 11 wherein said first passage means comprises a Y-type passage connecting each of said primary barrels through a single common conduit to said inlet of said container.

* * * * *